US010220599B2

United States Patent
Troendle et al.

(10) Patent No.: US 10,220,599 B2
(45) Date of Patent: Mar. 5, 2019

(54) GLUELESS DUSTLESS COMPOSITE FLOORING MATERIAL SYSTEM

(71) Applicants: John B. Troendle, Harahan, LA (US); Mo Qifeng, Changzhou (CN)

(72) Inventors: John B. Troendle, Harahan, LA (US); Mo Qifeng, Changzhou (CN)

( * ) Notice: Subject to any disclaimer, the term of this patent is extended or adjusted under 35 U.S.C. 154(b) by 43 days.

(21) Appl. No.: 15/194,843

(22) Filed: Jun. 28, 2016

(65) Prior Publication Data
US 2017/0370111 A1    Dec. 28, 2017

(51) Int. Cl.
*B32B 27/30* (2006.01)
*B32B 27/08* (2006.01)
*E04F 15/10* (2006.01)

(52) U.S. Cl.
CPC ............ *B32B 27/304* (2013.01); *B32B 27/08* (2013.01); *E04F 15/105* (2013.01); *E04F 15/107* (2013.01); *B32B 2255/10* (2013.01); *B32B 2255/26* (2013.01); *B32B 2307/102* (2013.01); *B32B 2307/536* (2013.01); *B32B 2307/554* (2013.01); *B32B 2471/00* (2013.01)

(58) Field of Classification Search
CPC .... E04F 15/163; E04F 15/182; B32B 27/304; B32B 27/08; B32B 2471/00; B32B 2307/554; B32B 2307/536; B32B 2255/26; B32B 2307/102; B32B 2255/10
See application file for complete search history.

(56) References Cited

U.S. PATENT DOCUMENTS

| 3,032,822 | A | 5/1962 | Maddock |
| 4,680,368 | A | 7/1987 | Nakamoto et al. |
| 6,558,795 | B2 | 5/2003 | Olson et al. |
| 6,730,388 | B2 | 5/2004 | MacQueen et al. |
| 8,166,718 | B2 | 5/2012 | Liu |
| 2006/0142455 | A1* | 6/2006 | Agarwal ............... B82Y 30/00 524/423 |
| 2006/0175728 | A1* | 8/2006 | Lavach ............... B29C 47/0004 264/176.1 |
| 2009/0223162 | A1 | 9/2009 | Chen et al. |
| 2009/0308001 | A1* | 12/2009 | Wu ........................ E04B 1/762 52/173.3 |
| 2011/0030300 | A1 | 2/2011 | Liu |

(Continued)

FOREIGN PATENT DOCUMENTS

| CN | 201972361 | 9/2011 |
| CN | 103881273 | 6/2014 |

(Continued)

*Primary Examiner* — Nathan L Van Sell
(74) *Attorney, Agent, or Firm* — Keaty Law Firm LLC

(57) ABSTRACT

A glueless dustless composite flooring material system providing PVC-based flooring having layers providing different qualities of hardness, wear-resistance, sound deadening, and decorative patterns, avoiding the use of moisture-susceptible compressed dust filler, with layers fused together, avoiding the manufacturing complexity and delamination risks of using glue or adhesive, with a quickly-cured, UV-cured top coating providing long-lasting high performance and shortening and simplifying the manufacturing, which can be done in a sheet-form, essentially continuous-run manner, with an ability to quickly and simply change the optional design printing and texturing produced, and having an optional underlayment layer.

19 Claims, 6 Drawing Sheets

(56) References Cited

U.S. PATENT DOCUMENTS

| | | | |
|---|---|---|---|
| 2013/0067842 A1* | 3/2013 | Meersseman | B32B 7/12 52/309.4 |
| 2013/0317157 A1* | 11/2013 | Sengoku | C08K 5/098 524/356 |
| 2014/0290158 A1* | 10/2014 | Meersseman | B32B 7/12 52/177 |
| 2015/0167320 A1* | 6/2015 | Meersseman | B32B 7/12 52/588.1 |
| 2015/0210055 A1* | 7/2015 | Pervan | B32B 38/145 156/277 |
| 2015/0267025 A1* | 9/2015 | Fang | B32B 3/26 428/318.6 |

FOREIGN PATENT DOCUMENTS

| | | |
|---|---|---|
| CN | 204920130 | 12/2015 |
| WO | WO2005116362 A1 | 12/2005 |
| WO | WO2007043082 | 4/2007 |
| WO | WO2015060778 | 4/2015 |
| WO | WO2015158595 | 10/2015 |

\* cited by examiner

GLUELESS DUSTLESS COMPOSITE FLOORING MATERIAL SYSTEM

BACKGROUND

This invention provides a PVC-based glueless dustless composite flooring material system that is efficiently manufactured and yields long-lasting, high-performing flooring.

Existing flooring-material products that use compressed dust as a core material are susceptible to damage and premature failure from water or other liquids, especially in damp environments and in uses that require frequent cleaning. The compressed-dust core, however, provides flooring material with certain desirable characteristics, such as sound-deadening. Elimination of compressed dust in the flooring composition requires a novel way to regain those characteristics through the use of different materials or different manufacturing processes.

Existing laminated flooring-material products that use glue or adhesive to bind the layers are susceptible to delamination and premature failure, especially in a damp environment. The handling, the application of, and the setting up or curing of adhesives adds complexity to the process of manufacturing flooring, making this step a potential bottleneck preventing efficient continuous-run or long-run manufacturing.

Applying a finishing coating to flooring material is a good way to improve the look and wear-resistance of flooring materials. But where the flooring material contains PVC, there are problems and issues in achieving proper adhesion of a finishing coating in the manufacturing process, and additional potential problems of premature delamination after installation. In order to get good adhesion in manufacturing, coatings requiring long curing times or complex handling are presently used. Polyurethane undergoes oxidative curing that is likely to take eight to ten hours. A two-part epoxy is likely to take at least thirty minutes to cure, which is still a long time and another potential bottleneck preventing continuous-run manufacturing. Also, two-part epoxy requires additional mixing and handling in the manufacturing process.

Surface designs and textures are usually printed on and pressed into flooring material, frequently imitating wood, stone, or tile. The present methods of applying these decorative patterns and textures are mostly limited to short, frequently repeating patterns that are impressed by a roller or plate of finite size. Where more than one color, tint, tone, or shade is to be applied, problems with registration frequently arise. Such limitations work against any ability to switch production from one decorative pattern to another. Once the production of a particular decorative pattern is calibrated and registered, there is some reluctance to make changes.

Where the manufacturer of flooring material has to address these problems, it is likely that either the price will go up or the profits will go down. If the problems are not addressed, the flooring material will likely fail prematurely. A flooring material that is free of glue and free of dust, but still having the desired qualities, is thus needed. A manufacturing method that is more efficient, more economical, more varied in decorative patterns, faster, and produces more durable and high-performing flooring material is also presently needed.

U.S. Publication No. 2011/0030300, published by David C. Liu on Feb. 10, 2011 for a "Floor and Tile with Padding," discloses a flexible floor board with a pad attached to the bottom side of the floor board. The pad covers partially the bottom side of the floor board and extends beyond the floor board. The bottom side of the pad is covered with a restickable glue layer and the floor board has a male lock on one end and a female lock on the other end. A floor board is engaged with an adjacent floor board by pressing down the female lock of the first floor board onto the male lock of the second floor board. The bottom side of the first floor board that is not covered by the pad is placed into contact with the pad of the second floor board that extends beyond the second floor board. The Liu flooring was developed due to the need for a hardwood floor without the problems of both glue-down and floating installation. The hardwood floor was meant to be installed easily without messy glue, without delamination, without hollow area, and without quick water damage.

U.S. Publication No. 2009/0223162 was published by Hao A. Chen et al. on Sep. 10, 2009, disclosing a "Connecting System for Surface Coverings." The publication provides for a blank that has opposing first and second ends extending along a width of the plank, opposing first and second longitudinal sides extending along a length of the plank, and opposing top and bottom surfaces. The plank can have a tongue edge at the first end and a groove edge at the second end. The tongue edge can be detachably lockable into the groove edge of an adjacent, identical plank. Surface covering systems having a plurality of the planks connected together are also provided. In particular, a preferred embodiment of the floor plank comprises (1) a top surface; (2) a bottom surface; (3) a first longitudinal side; (4) a second longitudinal side opposing the first longitudinal side; (5) a first end extending along the width of the floor plank and comprising a tongue edge; and (6) a second end opposing the first end, extending along the width of the floor plank, and comprising a groove edge. The tongue edge includes a vertical distal surface, substantially vertical to the top and bottom surfaces; a top planar slanted surface extending away from the vertical distal surface toward the top surface; a vertical lip extending downwardly from the top surface; a channel disposed substantially between the top planar slanted surface and the top surface, the channel comprising a channel bottom and a channel back, the channel back extending away from the channel bottom toward the vertical lip; a pinnacle rail connecting the top planar slanted surface and the channel, wherein the channel bottom extends vertically below the pinnacle rail, and the channel back extends laterally further away from the vertical distal surface than does the vertical lip; a bottom planar slanted surface extending away from the vertical distal surface towards the bottom surface; and a vertical shoulder extending from the bottom planar slanted surface to the bottom surface.

U.S. Pat. No. 6,558,795 issued to Keith E. Olson et al. on May 6, 2003 for a "Strippable Coating System." In the Olson et al. patent, a radiation curable coating contains an agent that imparts greater strippability to the cured coating. The agent can be included in the coating or in one or more subsequently-applied maintenance coats. The curable coating may be waterborne, comprised of inorganic particles, and the agents that impart greater strippability may enhance adhesion of a radiation curable maintenance coat to the cured coating. The agent may further comprise a chain transfer agent that reduces the molecular weight of the cured coating, and in a preferred embodiment may contain an alcohol, ester, aldehyde, or mixture thereof.

U.S. Pat. No. 6,730,388, issued to Richard C. MacQueen et al. on May 4, 2004, covers a "Coating Having Macroscopic Texture and Process for Making Same." In one embodiment of the MacQueen coating, the coated substrate comprises a substrate, a radiation-cured coating or a thermally-cured on at least a portion of the substrate, wherein the coating comprises an inherent macroscopic texture. In another embodiment, the invention provides for a pre-cured coating mixture comprising a radiation-curable resin and an initiator, or a thermally-curable resin and thermal initiator, wherein the radiation- or thermally-curable resin and the respective initiator form a pre-cured coating mixture capable of forming a macroscopic texture upon application of the mixture on a substrate. In another embodiment, the MacQueen patent provides a pre-cured coating mixture comprising a radiation- or thermally-curable resin, an initiator, and texture-producing particles having an effective size to provide a macroscopic texture upon application of the mixture on a substrate. In another embodiment, the invention provides a coated substrate comprising a substrate and a radiation- or thermally-cured coating on at least a portion of the substrate, wherein the coating comprises an inherent macroscopic texture. Additionally, the patent provides a process for making a coating on a substrate, comprising the steps of distributing a pre-cured coating mixture comprising a radiation-curable resin and an initiator or a thermally-curable resin and thermal initiator over at least a portion of a substrate to form a pre-cured coating having a macroscopic texture, and radiation-curing or thermally curing, respectively, the pre-cured coating to form a radiation-cured or thermally-cured coating having the macroscopic texture.

Chinese Publication No. 204920130, published Dec. 30, 2015 by Yang P., covers a "Porcelain Timber Apron Brick." The utility model of the Yang publication discloses a porcelain timber apron brick, including a ceramic tile layer, wood board layer, and waterproof layer. The wood board layer and waterproof layer are fixed respectively on both sides of the ceramic tile layer, with the wood board layer located on the upper surface of the ceramic tile layer. In the Yang tile, the thickness of the wood board layer and waterproof layer, in combination is less than the thickness of the ceramic tile layer. Being equipped with the wood board layer prevents the brick surface temperature from being excessively low, and improves comfort during use. The waterproof layer effectively prevents the waterlogging on the ground from entering the ceramic tile layer and wood board layer, granting a waterproof performance of the tile.

Chinese Publication No. 201972361 was published Sep. 14, 2011 by Liang Y. on a "Wood and Ceramic Composite Floor Tile." The utility model of the Liang publication discloses a wood and ceramic composite floor tile comprising a core material, a panel, and a bottom plate, wherein the core material is arranged between the panel and the bottom plate. The core material is connected with the panel and bottom plate respectively through an adhesion layer, and is one or more ceramic tiles. Frame bars are also provided and are arranged at the periphery of the core material. The tile attempts to solve problems of ceramic tile in that existing wood and ceramic composite floor tiles are easy to damage, and feature high manufacturing costs. The disclosed tile provides for a composite floor tile that is difficult to damage, easy to process, convenient to install, and has high non-deformability features, thereby effectively lowering costs of the tile.

U.S. Pat. No. 8,166,718, issued May 1, 2012 to David C. Liu, covers a "Horizontally Engineered Hardwood Floor and Method of Installation." The floor board includes a top decorative layer placed a plurality of strips. The plurality of strips is arranged to having some in X-axis orientation and some in Y-axis orientation. The plurality of strips also has characteristics that allow the wood floor board to be installed as a tile. Specifically, the Liu patent covers a high performance engineered wood floor board having a length, comprising (1) a top wood layer with wood grain lined up along the length of the floor board, the top wood layer having a top surface and a bottom surface; (2) a plurality of supporting strips attached under the top wood layer, a first subset of the plurality of supporting strips being oriented in a first direction and a second subset of the plurality of supporting strips being oriented in a second direction, the first subset of the plurality of supporting strips being separated physically from and without being in contact with the second subset of the plurality of supporting strips, wherein the top wood layer substantially covers the first and second subsets of supporting strips; and (3) an adhesive layer placed between the top wood layer and the plurality of supporting strips. The adhesive layer covers the bottom surface of the top wood layer. Additionally, a first supporting strip in the plurality of support strips has a locking lip, and a second supporting strip in the plurality has a recessed slot, and the locking lip of the first supporting strip of the high performance engineering wood floor board is able to couple to the recessed slot of the second supporting strip of the floor board.

International Publication No. WO 2005/116362A1 was published Dec. 8, 2005 by Delong Tao, disclosing "A Ceramic Wood Laminated Floor." The floor of the Tao publication consists of a base layer that is made of ceramic tile, and a surface layer that is made of wood or bamboo. Between the surface layer and the base layer, a bonding coat is set. The undersurface of the base layer is equipped with an elastic pad.

This invention provides a glueless dustless composite flooring material system of PVC-based flooring having layers providing different qualities of hardness, wear-resistance, sound deadening, and decorative patterns, with layers fused together without glue or adhesives, with a UV-cured top coating, optional, changeable design printing and texturing, and optionally having an underlayment layer, which can be manufactured in a sheet-form, essentially continuous-run manner, with an ability to quickly and simply change the optional design printing and texturing produced, yielding a long-lasting, high-performing flooring product.

SUMMARY OF THE INVENTION

This invention avoids the use of compressed-dust filler, which is susceptible to water damage such as swelling and failing. This invention avoids the use of glue or adhesive, which is susceptible to premature delamination failure and which increases the costs and complexity of manufacturing. The desirable qualities of compressed-dust filler and of glue or adhesive are provided in novel ways.

BRIEF DESCRIPTION OF DRAWINGS

Reference will now be made to the drawings, wherein like parts are designated by like numerals, and wherein.

DETAILED DESCRIPTION OF THE INVENTION

Referring to all figures generally, embodiments of the glueless dustless composite flooring system 100 and production method 200 are illustrated.

Figure 1:
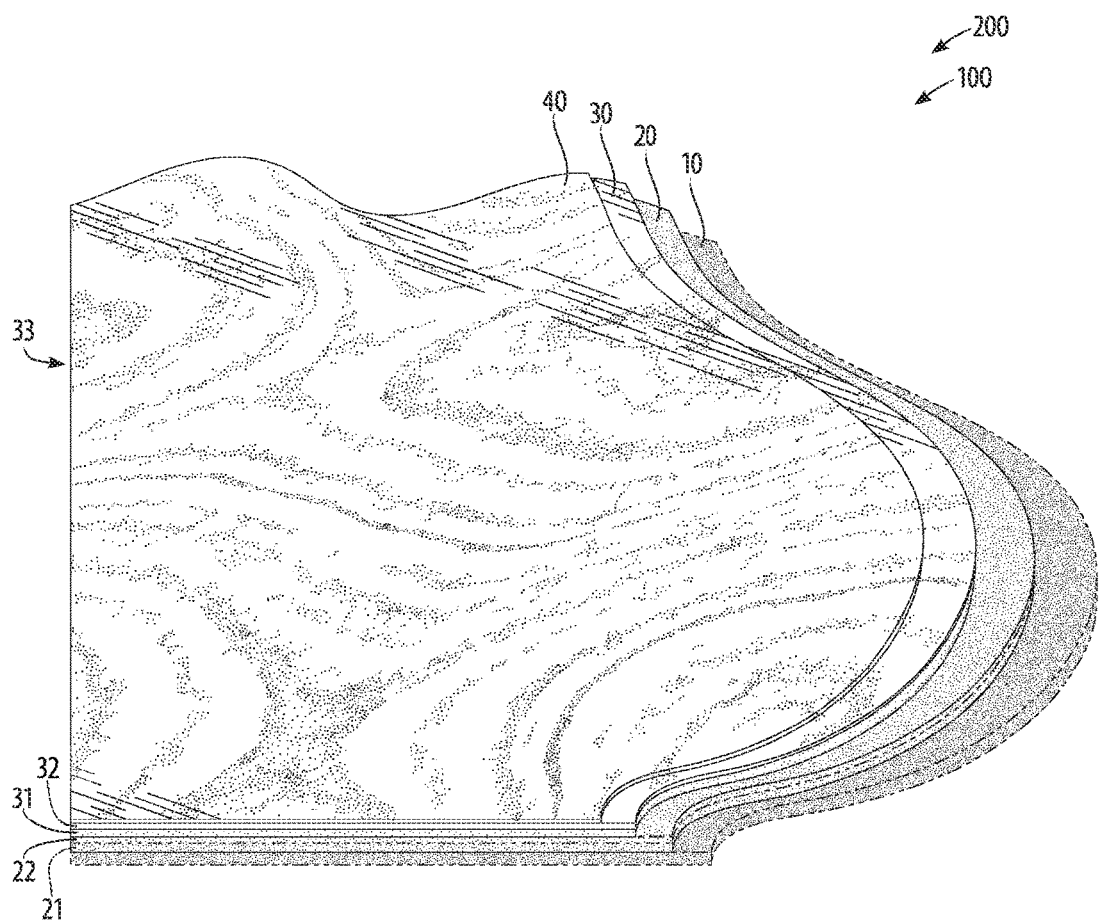
FIG. 1 is a schematic cutaway view of an embodiment of the glueless dustless composite flooring material system of the invention.
Figure 2:
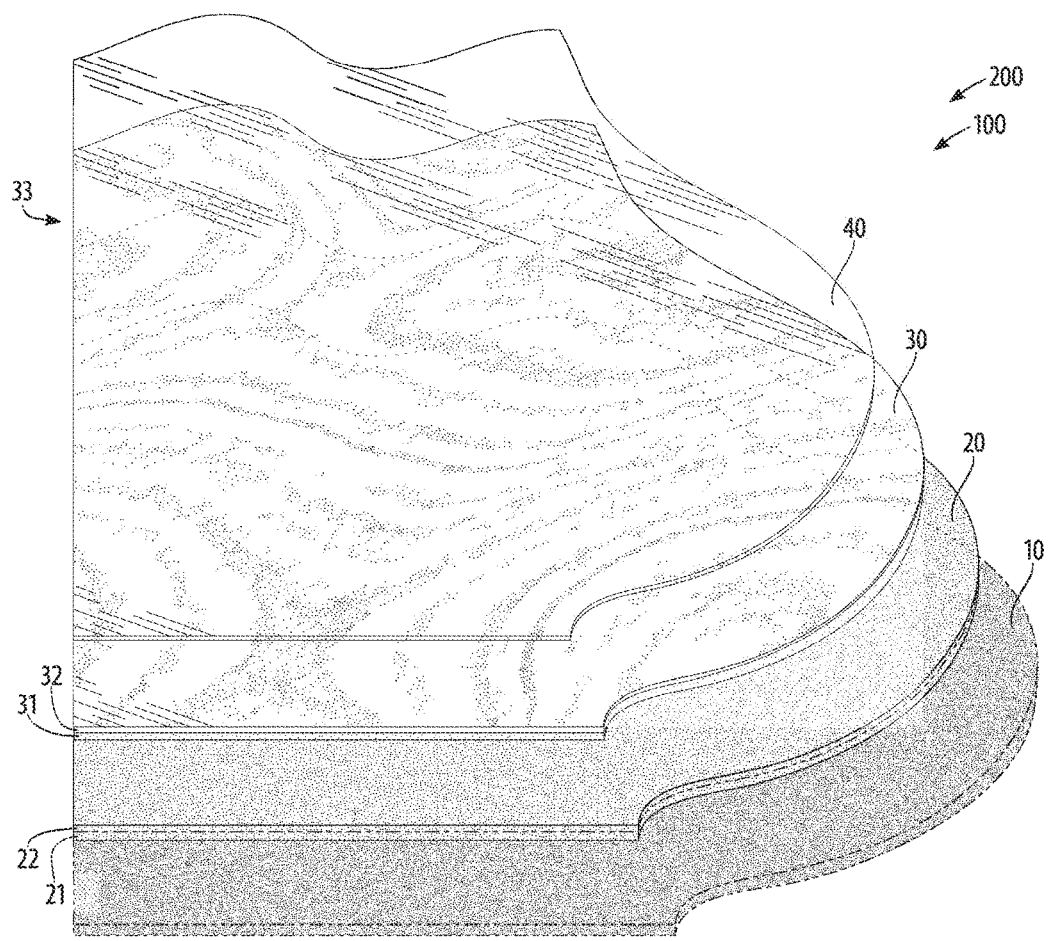
FIG. 2 is schematic exploded view of an embodiment of the clueless dustless composite flooring material system of the invention.

Referring to FIG. 1 & FIG. 2, the glueless dustless composite flooring system 100 comprises three layers 20, 30, 40 of different materials strongly bonded one to another without the use of separate glues or adhesives, and an optional underlayment layer 10. The optional underlayment layer 10 can be a natural material such as cork or rubber, or a synthetic material such as either an open-cell or a closed-cell plastic foam. Ethylene vinyl acetate (EVA) is a suitable material. The glueless dustless composite flooring system 100 provides a waterproof covering for any type of optional underlayment layer 10 used, allowing the use of water-sensitive materials for the underlayment. The optional underlayment layer 10 can be omitted, or can be affixed to the finished flooring during manufacture, or can be made available as a separately packaged item. Depending upon the ability of any particular underlayment material to withstand the hot-melt overlaying process disclosed below, the underlayment can be affixed to the rest of the glueless dustless composite flooring system 100 either earlier or later in the manufacturing process.

The glueless dustless composite flooring system 100 provides a flooring base layer 20, which is formed by fusion, extrusion, and mold, forming of a blended mixture of PVC resins and other materials according to the glueless dustless composite flooring system method 200 illustrated in FIG. 8 and disclosed in more detail below. Optionally, two or more different mixtures of PVC resins and other materials can be co-extruded into the same mold, which will produce a fused flooring base layer 20 with different sublayers or strata, such as the first base extrusion 21 and the second base extrusion 22 illustrated. The PVC-resin blend can be adjusted through the use of different materials and fillers, or different proportions of materials and fillers, to have different properties when fused and extruded. If one PVC-resin blend yields a desired hardness and stability, but is deficient in sound-deadening or other sponginess qualities, then a different PVC-resin blend or a different extrusion technique can be applied as a co-extrusion in order to provide the otherwise-missing qualities. In a preferred co-extruded embodiment, a stiffer, harder stratum is formed for strength and a dense-foam, springier stratum is formed for cushioning and sound absorption.

The ability to adjust the characteristics of the flooring base layer 20, and therefore of the overall finished flooring, by adjustment of one or more PVC-resin blends and one or more extrusion methods eliminates the need to use compressed dust, which is vulnerable to moisture and is otherwise problematic in some climates and for some uses. For example, the formation of a controlled amount of a dense foam consistency in the flooring base layer 20, either in that entire layer or stratified within that layer, depending on the concurrent need for stiffness, can duplicate the desirable qualities of a compressed-dust core, but without the disadvantages of the dust.

A preferred embodiment of the mix of materials comprising a suitable flooring base layer 20 is (1) PVC: 50 kg; (2) 800-1000 $CaCO_3$ (mesh calcium carbonate): 75-100 kg; (3) Stabilizer: Ca/Zn: 3.8-5.0 kg; (4) Chlorinated polyethylene CPE: 2.5-4.0 kg; (5) Modifier ACR (acrylic copolymer): 3.0-4.0 kg; (6) High density polyethylene oxide OA6: 0.2-0.3 kg; (7) Internal lubricant G60: 0.4-0.6 kg; and (8) High melting point polymer PE-WAX: 0.5-0.7 kg. This mixture is suitable for either a singly extruded base layer or for a co-extruded layer. Another preferred embodiment of the mix of materials, comprising a suitable co-extruded layer, is PVC: 50 kg; 800-1000 $CaCO_3$ (mesh calcium carbonate): 25-50 kg; Stabilizer: Ca/Zn: 3.0-4.0 kg; Chlorinated polyethylene CPE: 2.0-4.0 kg; Modifier ACR (Acrylic Modifier): 2.0-3.5 kg High density polyethylene oxide OA6: 0.1-0.2 kg; Internal lubricant G60: 0.2-0.4 kg; High melting point polymer PE-WAX: 0.15-0.35 kg; Epoxidized soybean oil, DOBS: 1.0-2.0 kg.

The method of producing the glueless dustless flooring material system provides for the mixing of the materials for the flooring base layer 20 in a suitable large container until the materials are thoroughly mixed. Then, either in the same large container or in a different one, the fusing step provides for the heating of the mixture of materials while continuing the mixing of the materials. A preferred embodiment of the method heats the mixture to 115-130° C. while stirring at a high speed approaching, but not exceeding, 1600 RPM. After fusion is complete, the fused PVC material is allowed to cool somewhat. The PVC material is destined to be re-heated in the extrusion process, so if the batch of fused mixture is to be immediately sent to the extruder, then the fused mixture needs to be cooled enough to be safely and efficiently conveyed from the dusty mixing and fusing area to the cleaner environs of the extrusion and molding area. This conveyance or delivery can be effected by using a large pipe, as is known in the art. Water or another coolant can be circulated in a jacket around the container used for fusing in order to carry heat away from the fused PVC mixture, taking care not to force too rapid of cooling, which might affect the plastic properties of the flooring base layer 20.

The mixing, fusing, and cooling steps are by nature batch processes. However, by careful adjustment and control of the processes, or by setting up more than one production line and staggering its operation, an essentially continuous supply of fused PVC material can be produced and supplied to the subsequent operations.

The fused PVC mixture is conveyed to a screw extruder for extrusion to an extrusion mold at an elevated temperature and pressure. A preferred embodiment is extruded using an 80 mm-diameter screw at a speed not exceeding 40 RPM, an extrusion pressure of 20-35 mpa, and a temperature of 160-186° C. More than one mixture can be co-extruded to the same extrusion mold for the purpose of forming different strata, as disclosed above. This extruding and mold-forming process yields a sheet of flooring base layer 20. The sheet can be very long, or essentially continuous. If the mixing-fusing-cooling-delivering steps of the process are properly coordinated so as to provide a continuous supply of fused PVC material to the screw extruder, then the extruder can supply an essentially continuous sheet of flooring base layer 20 for hot-melt overlaying of an essentially continuous sheet of flooring face layer 30.

Figure 3:
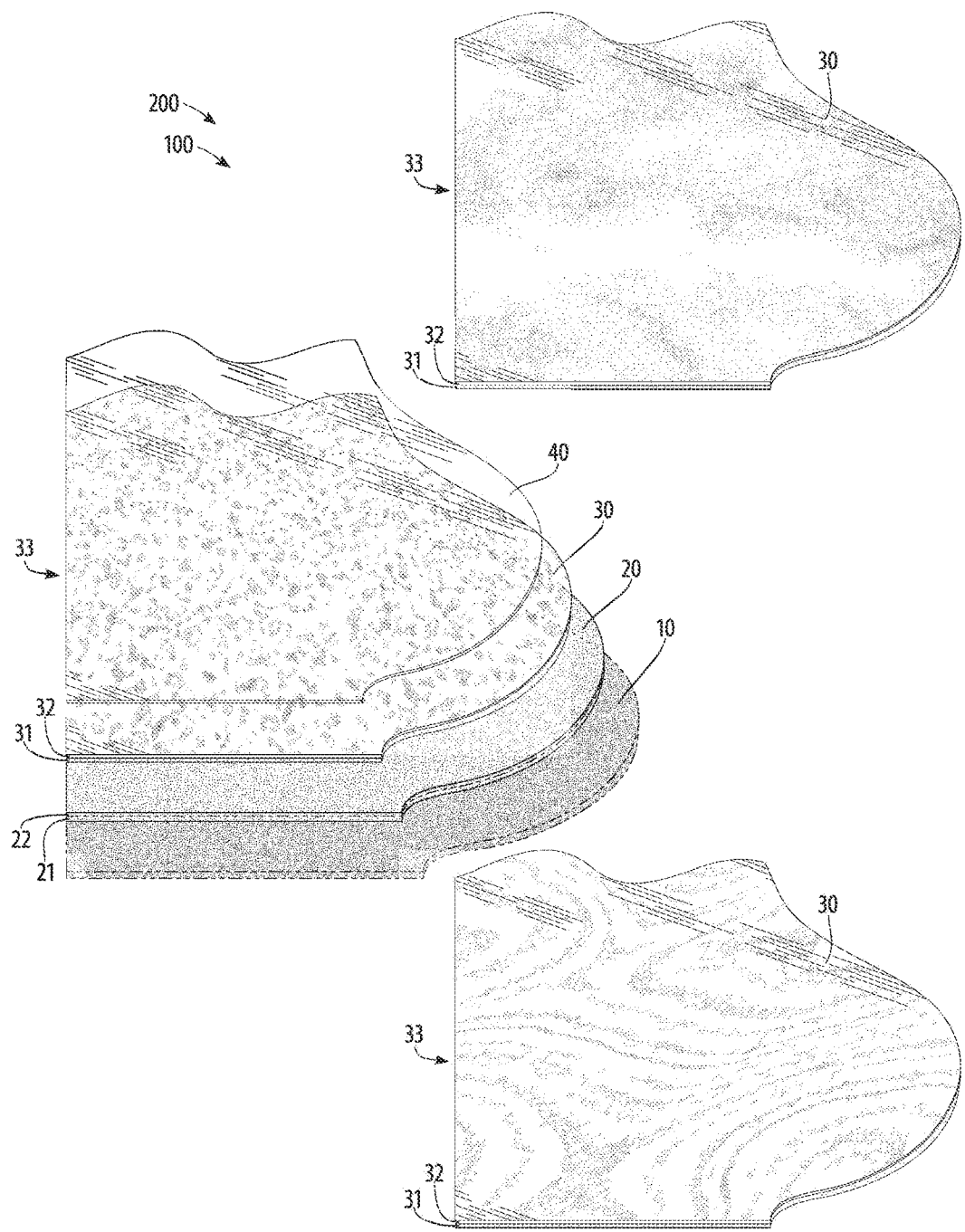
FIG. 3 is a schematic exploded view of embodiments of the clueless dustless composite flooring material system of the invention.
Figure 4:
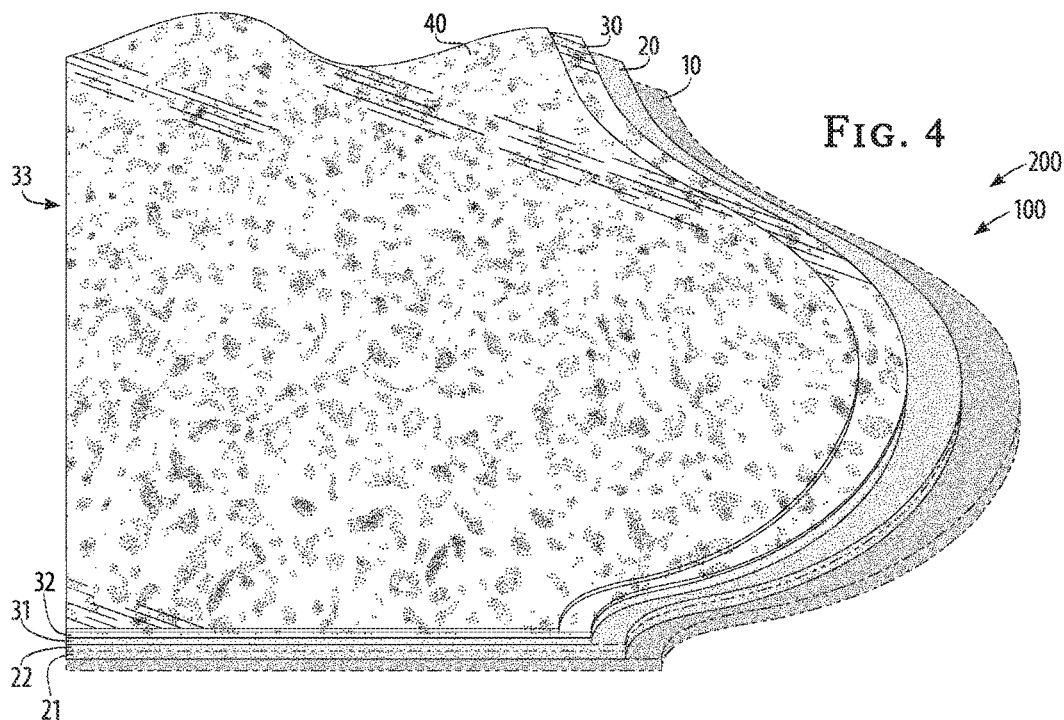
FIG. 4 is a schematic cutaway view of another embodiment of the clueless dustless composite flooring material system of the invention, imitating terrazzo.
Figure 5:
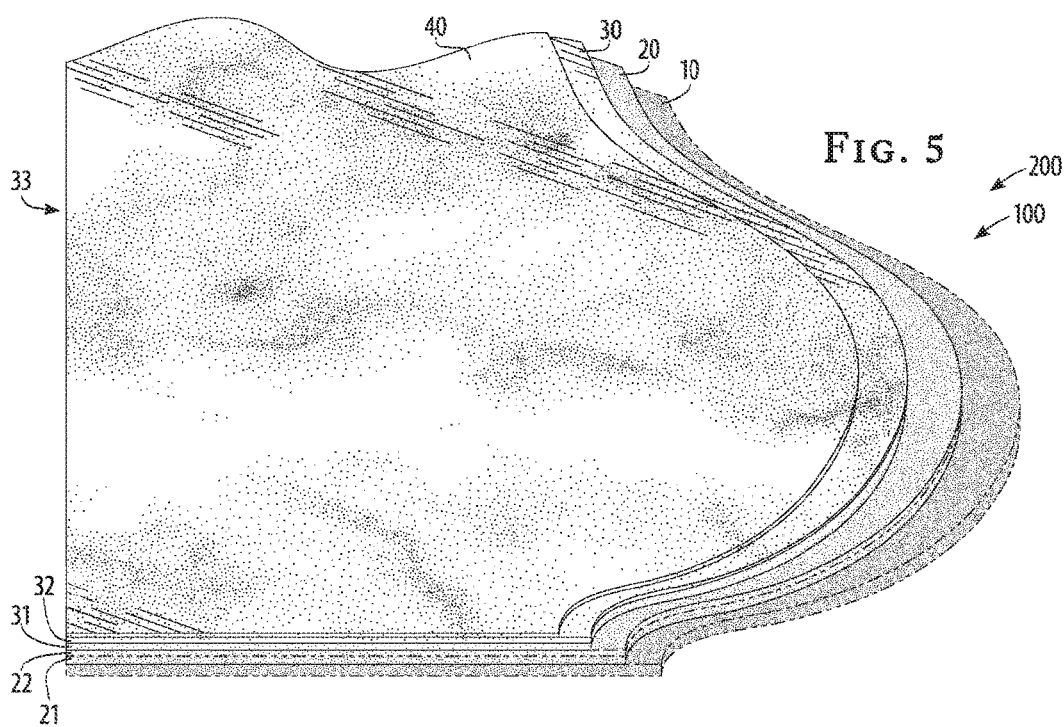
FIG. 5 is a schematic cutaway view of another embodiment of the clueless dustless composite flooring material system of the invention, imitating marble.
Figure 6:
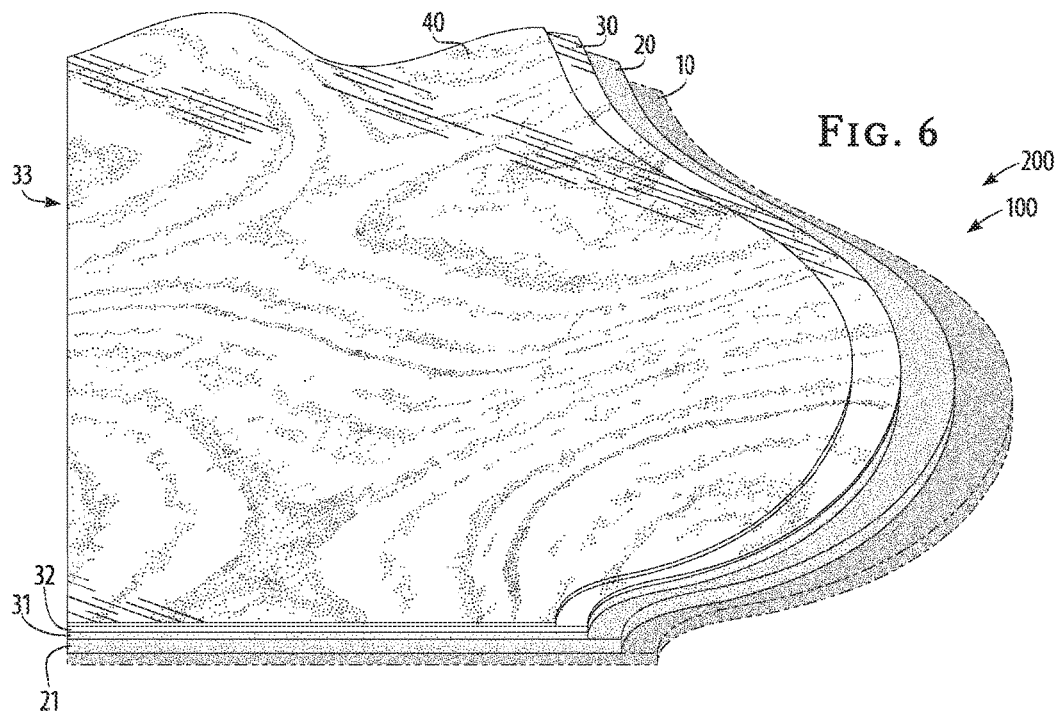
FIG. 6 is a schematic cutaway view of an embodiment of the clueless dustless composite flooring material system of the invention, having a single-extruded base layer.
Figure 7:
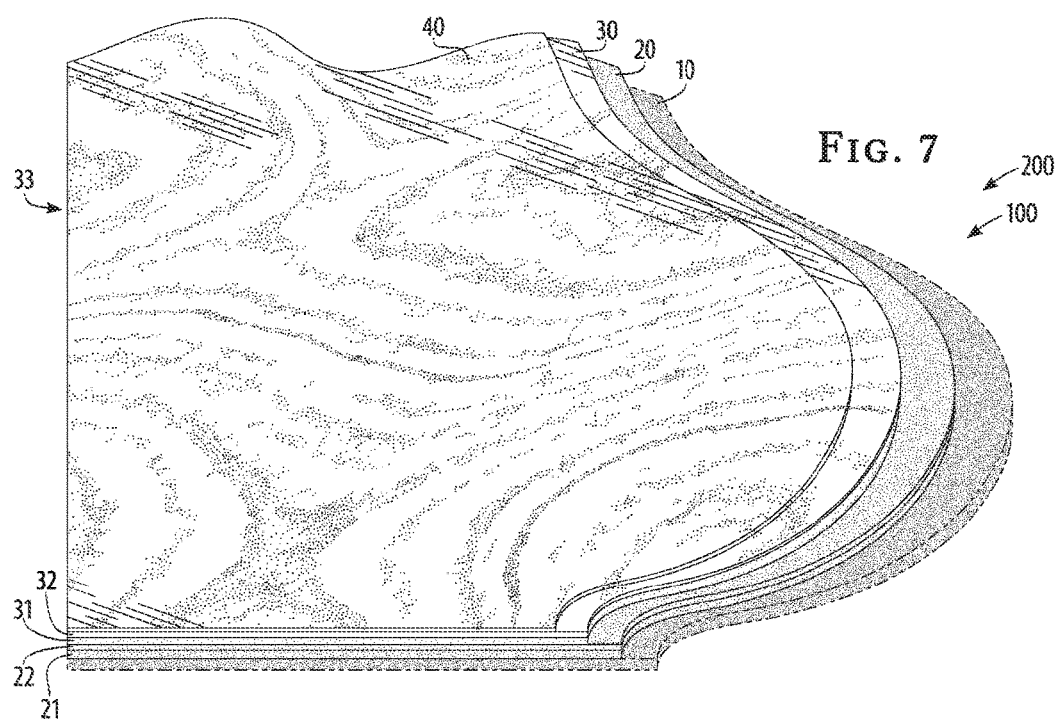
FIG. 7 is a schematic cutaway view of an embodiment of the clueless dustless composite flooring material system of the invention, having a double-extruded base layer.

The flooring face layer 30 comprises a decorative face sublayer 31 fused to a wearing face sublayer 32. The decorative face sublayer 31 can be formed from a PVC decorative film, and will usually be opaque and of a color acting as a base color or background color for any decorative pattern 33 that is intended to be applied, such as imitations of wood, stone, or tile, or other decorative patterns. The wearing face sublayer 32 can be formed from a high-molecular wear-resistant PVC polymer film, usually clear or mostly clear, so that the decorative face sublayer 31 may be seen. In most embodiments of the glueless dustless composite flooring system 100, a decorative pattern 33 will be applied to the decorative face sublayer 31 before it is fused with the wearing face sublayer 32. The decorative pattern 33 is likely to be in imitation of traditional flooring materials such as wood, stone, or tile. Referring briefly to FIG. 3, illustrating schematically that the flooring face layer 30 might have a decorative pattern in imitation of marble, terrazzo, or wood, different decorative patterns 33 can be used with the glueless dustless composite flooring system 100. The patterns can be applied with a printing roller or with a digital image-printing device. An advantage of digital printing is that an image with no exact repetition or a very long period of repetition can be produced, in contrast with the repetition inherent in roller printing. Another advantage of digital printing is that several different colors, shades, or tones can be applied or even blended in place, which is either very cumbersome or is not possible with roller printing in a floor-manufacturing environment.

The PVC decorative film forming the decorative face sublayer 31 can be supplied in large rolls. The strength and wear characteristics of this PVC decorative film do not significantly influence the strength and wear characteristics of the finished flooring, because other elements provide such strength and wear characteristics. As a practical matter, the PVC decorative film should be strong enough to avoid tearing during the floor-manufacturing process.

The use of a high-molecular wear-resistant PVC polymer film for the wearing face sublayer 32 provides a significant portion of the desired wear resistance of the finished flooring, with the flooring coating layer 40 providing the rest. This film can also be supplied in large rolls.

An essentially continuous sheet of flooring face layer 30 can be produced by using large rolls of the PVC films, or by having an efficient re-loading method.

Although the wearing face sublayer 32 can be fused to the decorative face sublayer 31 as a separate step in the manufacturing process, before subsequently being fused with the flooring base layer 20, a preferred embodiment of the glueless dustless composite flooring system method 200 provides for simultaneous fusing of the wearing face sublayer 32, the decorative face sublayer 31, and the flooring base layer 20 in one pass. This fusion is achieved by hot-melt overlaying, bringing the sublayers and layers into contact with one another in the proper order, and simultaneously heating and applying compression to the stack to fuse the layers together without the use of glue or adhesive, and therefore essentially eliminating potential problems of delamination or other failure of the finished flooring. The hot-melt overlaying can be effected by feeding the wearing face sublayer 32, the decorative face sublayer 31, and the flooring base layer 20 into a set of heated rollers. Where the wearing face sublayer 32 and the decorative face sublayer 31 are supplied as large rolls of PVC polymer films of essentially equal width, and the flooring base layer 20 is formed in sheets of essentially the same width as the rolls of films, or in divisions of that width allowing side-by-side simultaneous processing of multiple sheets, the hot-melt overlaying can be performed in a continuous or nearly continuous run.

Optionally, a textured, embossed, or debossed surface pattern can be applied to the flooring face layer 30 of the fused base and face layers. Such a texture can be an imitative decorative texture complementing a printed decorative pattern 33, or can be a texture intended to improve traction, light reflection, or other qualities of the finished flooring. The textured, embossed, or debossed surface pattern can be applied to the flooring face layer 30 of the fused base and face layers either concurrently with the hot-melt overlaying compression stage or immediately after, while the flooring face layer 30 is still partially melted and pliable. The hot-melt roller or rollers making contact with the flooring face layer 30 can be configured to emboss the texture, although the arrangement would require either a small repetitive period of the texture or a large roller. The embossing can be performed by one or more rollers, plates, or other devices, such as rakes pressing into the flooring face layer 30 of the now-fused base and face layers immediately after the hot-melt overlaying compression, while the partial assembly is still pliable. Depending on the amount and nature of the texturing, cylinders of stiff wire could be used as rollers for debossing, perforated cylinders could be used as rollers for embossing, or a rake arrangement, possibly allowing for movement of the tines in order to create variation, could be used.

The hot-melt overlaying fuses the flooring face layer 30 and the flooring base layer 20 together without the use of glue or adhesive. The face-and-base subassembly emerges from the hot-melt overlaying and optional texturing at a very high temperature. The face-and-base subassembly is then conditioned. This conditioning step allows the face-and-base subassembly to cool to the ambient temperature fairly slowly and evenly, without quenching or other sudden cooling, in order to prevent the development of stress in the sheet. Because the face-and-base subassembly is a thin sheet that is almost completely surface area, the cooling does not require an inordinate amount of time, and conditioning can be effected on a continuous-run basis by providing a sufficient extra length of conveyor belt to allow for cooling. Optionally, additional conditioning procedures can be performed, such as corona discharging or flaming in order to prepare the PVC surface for application of the flooring coating layer 40. The optional underlayment 10 can be added to the subassembly at this point or subsequent points after the hot-melt overlaying and optional texturing have been performed.

An essentially continuous sheet of the face-and-base subassembly can be produced by the hot-melt overlaying step if there is a continuous supply of base-layer and face-layer sheet.

After the face-and-base subassembly has cooled in the conditioning step, the subassembly is then coated on the top or flooring-face-layer 30 side with a plastic resin which can be cured under ultraviolet (UV) light, forming a flooring coating layer 40. UV-curing primers and top coatings suitable for application onto PVC are known in the art. Generally, the UV-curing primer and top coating will be clear, colorless, and transparent, allowing the decorative pattern 33 to show through. Generally, colorless coatings can be cured more quickly and with less exposure than colored coatings. UV-curing top coats are available which provide a glossy finish or a matte finish, and which have such desirable properties as scratch resistance. Optionally, a gritty particulate material such as aluminum oxide can be added to the UV-curing plastic resin and incorporated into the flooring coating layer 40 to provide additional traction and additional wear resistance. In a preferred embodiment, the UV primer and the UV top coats are applied with a series of rollers in long runs or a continuous run.

There should be an application of UV-curing primer and at least one application of UV-curing top coat, although more than one application of UV-curing top coat will likely improve the appearance and durability of the finished flooring. The curing is effected by exposure to UV light from, for example, Mercury (Hg) lamps or Gallium (Ga) lamps. UV curing is effected very quickly, in only a few seconds, and can be accomplished in the time that a workpiece travels on a conveyer belt passing under a bank of UV lights. In contrast, oxidative curing of polyurethane is likely to take eight to ten hours, and curing of a two-part epoxy is likely to take at least thirty minutes or more.

The use of UV-curing plastic resins in the flooring coating layer 40 of the glueless dustless composite flooring system method 200 eliminates a potential bottleneck in the manufacturing process, which enables production of an essentially continuous sheet of fully assembled, fused, decorated, coated, and cured flooring material. The coating and UV curing of the fused base-and-face subassembly yields a finished-large-sheet assembly of a composite flooring material that incorporates the flooring base layer 20, the flooring face layer 30, and the flooring coating layer 40, with an optional underlayment layer 10. This finished-large-sheet assembly is intended to be divided into segments of desired size and configuration, such as a tile or a plank, which can be easily handled during installation, or a large rolled sheet.

The final steps in the glueless dustless composite flooring system method 200 are profile processing, in which the large sheet of finished flooring material is cut to the desired size and has the appropriate notches, grooves, tabs, or other installation-related components formed, then inspecting, and then packing the finished, profiled flooring material for transport and sale.

Figure 8:
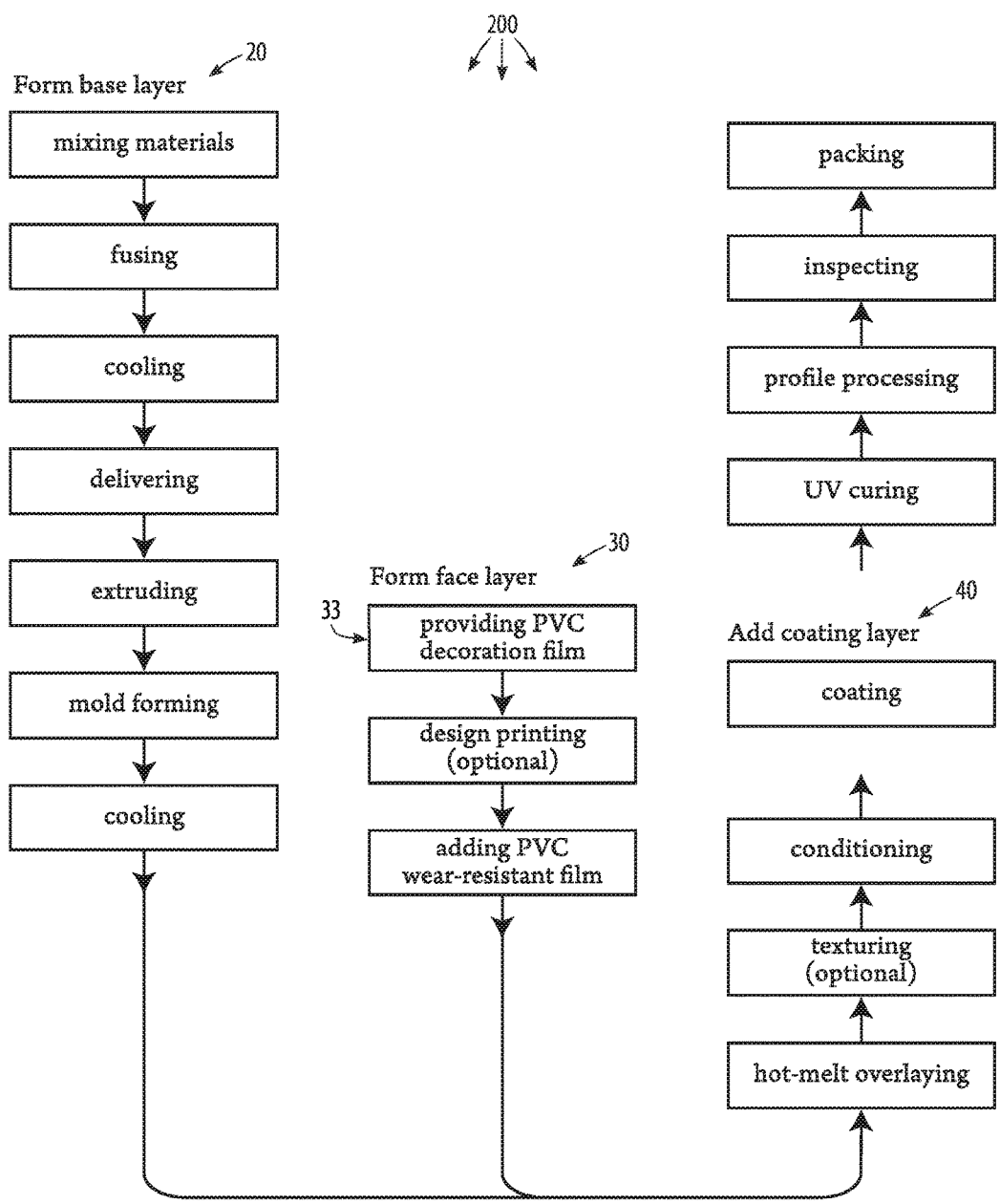
FIG. 8 is a flow chart representation of the method of production of the clueless dustless composite flooring material system of the invention.

Referring to FIG. 8, a flowchart representation of the glueless dustless composite flooring system production method 200, the flooring base layer 20 is formed from PVC and other raw materials by the mixing, fusing, cooling, delivering, extruding, mold-forming, and conditioning-cooling, yielding a sheet-form supply of flooring base layer 20 that can be essentially continuous. The flooring face layer 30 is separately, and potentially simultaneously, formed by providing PVC decoration film, optionally printing a decorative pattern 33 upon it, and then adding PVC wear-resistant film, yielding a sheet-form supply of flooring face layer 30 that can also be essentially continuous. Then the sheets of flooring base layer 20 and flooring face layer 30 are brought into proximity in the appropriate orientation and fused together, without glue or adhesives, by hot-melt overlaying, optionally followed by texturing, yielding a sheet-form supply of base-and-face subassembly that can also be essentially continuous. Then a conditioning step allows the hot-melted base-and-face subassembly to cool, and optionally provides other conditioning procedures. Then a coating of UV-curing plastic resin is applied as a primer layer and at least one top coat layer. After each application of UV-curing plastic resin, the sheet of coated flooring material is subjected to UV curing by exposure to UV light, effecting a very rapid curing. The conditioning, coating, and UV curing processes can be performed on an essentially continuous, sheet-form supply of base-and-face subassembly, and yields a sheet-form supply of finished, fused, coated, and cured flooring material that can also be essentially continuous. Then the sheet of finished flooring is cut to size and has any notches, grooves, or tabs for installation purposes formed in the profile processing step. Inspecting and packing the profiled flooring-material pieces are the finals steps.

The glueless dustless composite flooring system method 200 provides an ability to manufacture flooring on a continuous-run assembly-line conveyor-belt basis. It also provides an ability to efficiently change production from one color or design pattern to another. It yields a flooring-material product that contains no dust and no glue, yet possesses the desirable qualities associated with dust and glue, which are achieved by other, novel means.

Many changes and modifications can be made in the present invention without departing from the spirit thereof. I therefore pray that rights to the present invention be limited only by the scope of the appended claims.

What is claimed is:

1. A glueless dustless composite flooring material product having a nominal top and bottom direction, the glueless dustless composite flooring material comprising:
   (i) a flooring base layer comprising a PVC resin mixture free of compressed cellulose material and glue and having compatible materials adapted to provide desired qualities in said flooring base layer, in use, said mixture formable by mixing, fusing, cooling, delivering, extruding, and mold forming;
   (ii) a flooring face layer comprising a decorative face sub-layer secured atop the flooring base layer and a wearing face sub-layer secured atop the decorative face layer, the decorative face sub-layer comprising a PVC decorative polymer film and the wearing face sub-layer comprising a PVC wear-resistant film;
   wherein said flooring face layer is fused by hot-melt overlaying to a top face of said flooring base layer and forms a unitary base-and-face subassembly; and
   (iii) a waterproof flooring coating layer comprising a UV-curable plastic resin and secured atop the wearing face layer, the flooring coating layer being formable by coating a top face of said base-and-face subassembly with at least one UV-curable plastic resin;
   wherein said base-and-face assembly and said flooring coating layer are fusable together and form a waterproof finished-large-sheet assembly;
   wherein said finished-large-sheet assembly is profile-processable to desired size and shape, yielding multiple flooring segments of waterproof floor covering free of water-based materials.

2. The glueless dustless composite flooring material of claim 1, wherein said flooring base layer comprises a first extruded base sub-layer and a second co-extruded base sub-layer fused atop the first base sub-layer, the first and the second base layers being mold formable.

3. The glueless dustless composite flooring material of claim 1, further comprising (iv) an underlayment layer.

4. The glueless dustless composite flooring material of claim 1, wherein said PVC decorative polymer film further comprises a colored film.

5. The glueless dustless composite flooring material of claim 1, wherein said PVC decorative polymer film further comprises an applied decorative pattern.

6. The glueless dustless composite flooring material of claim 1, further comprising a textured surface embossed upon said base-and-face assembly.

7. The glueless dustless composite flooring material of claim 1, wherein said PVC wear-resistant polymer film is transparent.

8. The glueless dustless composite flooring material of claim 1, wherein said flooring coating layer is transparent.

9. The glueless dustless composite flooring material of claim 1, wherein said flooring coating layer further comprises a gritty particulate material.

10. The glueless dustless composite flooring material of claim 1, wherein said flooring coating layer further comprises aluminum oxide.

11. The glueless dustless composite flooring material of claim 1, wherein said PVC resin mixture comprises:
    (a) 50 kg PVC;
    (b) 75-100 kg 800-1000 mesh calcium carbonate ($CaCO_3$);
    (c) 3.8-5.0 kg Ca/Zn Heat Stabilizer;
    (d) 2.5-4.0 kg Chlorinated polyethylene elastomer (CPE);
    (e) 3.0-4.0 kg Acrylic polymer (ACR) Modifier;
    (f) 0.2-0.3 kg High density polyethylene oxide OA6;
    (g) 0.4-0.6 kg Internal lubricant G60; and
    (h) 0.5-0.7 kg High melting point polymer PE-wax.

12. The glueless dustless composite flooring material of claim 1, wherein said PVC resin mixture comprises:
    (a) 50 kg PVC;
    (b) 25-50 kg 800-1000 mesh calcium carbonate ($CaCO_3$);
    (c) 3.0-4.0 kg Ca/Zn Heat Stabilizer;
    (d) 2.0-4.0 kg Chlorinated polyethylene elastomer (CPE);
    (e) 2.0-3.5 kg Acrylic polymer (ACR) Modifier;
    (f) 0.1-0.2 kg High density polyethylene oxide OA6;
    (g) 0.2-0.4 kg Internal lubricant G60;
    (h) 0.15-0.35 kg High melting point polymer PE-wax; and
    (i) 1.0-2.0 kg Epoxidized soybean oil.

13. The glueless dustless composite flooring material of claim 1, wherein said flooring coating layer further comprises a UV-curable primer and at least one UV-curable top coat.

14. The glueless dustless composite flooring material of claim 1, wherein said UV-curable plastic resin is curable by exposure to Mercury (Hg) lamps.

15. The glueless dustless composite flooring material of claim 1, wherein said UV-curable plastic resin is curable by exposure to Gallium (Ga) lamps.

16. The glueless dustless composite flooring material of claim 1, wherein said flooring base layer is formable by heating the mixture to 115-130° C. while stirring at a high speed approaching but not exceeding 1600 RPM.

17. The glueless dustless composite flooring material of claim 1, wherein hot-melt overlaying of said flooring face layer and said flooring base layer are fusable by passing the flooring base and the face layers through at least one set of heated rollers.

18. The glueless dustless composite flooring material of claim 1, wherein extrusion of said flooring base layer further comprises extrusion using an 80 mm-diameter screw at a speed not exceeding 40 RPM, an extrusion pressure of 20-35 mpa, and a temperature of 160-186° C.

19. A glueless dustless composite flooring material product having a nominal top and bottom direction, the glueless dustless composite flooring material comprising:
   (i) a flooring base layer comprising a PVC resin mixture free of compressed cellulose material and free of glue, said PVC resin mixture having compatible materials adapted to provide desired qualities in said flooring base layer, in use, said mixture formable by mixing, fusing, cooling, delivering, co-extruding, and mold forming, said PVC resin mixture comprising, by weight, between 30.38% and 60.65%, inclusive, polyvinylchloride, between 30.32% and 60.75%, inclusive, calcium carbonate, between 3.04% and 3.64%, inclusive, calcium-zinc heat stabilizer, between 2.4% and 2.43%, inclusive, chlorinated polyethylene elastomer, between 2.42% and 2.43%, inclusive, acrylic polymer modifier, between 0.12% and 0.18%, inclusive, polyethylene oxide, between 0.15% and 0.36%, inclusive, internal lubricant, between 0.18% and 0.43%, inclusive, high melting point PE-wax, and, optionally, between 0.06% and 1.22%, inclusive, epoxidized soybean oil
   (ii) a flooring face layer comprising a decorative face sub-layer secured atop the flooring base layer and a wearing face sub-layer secured atop said decorative face layer, the decorative face sub-layer comprising a PVC decorative film with an applied decorative pattern, and the wearing face sub-layer comprising a PVC wear-resistant film;
   wherein said flooring face layer is fused by hot-melt overlaying to a top face of said flooring base layer and forms a unitary base-and-face subassembly; and
   (iii) a waterproof flooring coating layer comprising a UV-curable plastic resin and secured atop the wearing face layer, the flooring coating layer being formable by coating a top face of said base-and-face subassembly with at least one UV-curable plastic resin;
   wherein layers of said base-and-face assembly and said flooring coating layer are fusable together and form a waterproof finished-large-sheet assembly;
   wherein said finished-large-sheet assembly is profile-processable to desired size and shape, yielding multiple flooring segments of waterproof floor covering free of water-based material.

* * * * *